US012759004B2

(12) United States Patent
Kim

(10) Patent No.: US 12,759,004 B2
(45) Date of Patent: Oct. 13, 2026

(54) PAINTING APPARATUS

(71) Applicant: TCI CO., LTD., Ulsan (KR)

(72) Inventor: Yunyoung Kim, Ulsan (KR)

(*) Notice: Subject to any disclaimer, the term of this patent is extended or adjusted under 35 U.S.C. 154(b) by 566 days.

(21) Appl. No.: 18/496,800

(22) Filed: Oct. 27, 2023

(65) Prior Publication Data

US 2024/0139766 A1 May 2, 2024

(30) Foreign Application Priority Data

Oct. 31, 2022 (KR) ........................ 10-2022-0142388

(51) Int. Cl.

*B05B 13/02* (2006.01)
*B05B 9/03* (2006.01)
*B05B 12/08* (2006.01)
*B05B 14/465* (2018.01)

(52) U.S. Cl.

CPC .......... *B05B 13/0221* (2013.01); *B05B 9/035* (2013.01); *B05B 12/084* (2013.01); *B05B 14/465* (2018.02)

(58) Field of Classification Search

None

See application file for complete search history.

(56) References Cited

U.S. PATENT DOCUMENTS 2,579,357 A * 12/1951 Arvedlund .............. B05B 9/002 239/135
2,786,000 A * 3/1957 Roach ...................... B05B 15/55 134/22.12
2,964,245 A * 12/1960 Anderson ............... E01C 23/22 239/150
3,013,730 A * 12/1961 Bok ...................... B05B 7/1686 239/125
3,031,145 A * 4/1962 Croskey .................... B05B 5/03 239/706
3,403,695 A * 10/1968 Hopkins ............... B05B 12/149 239/335
4,830,882 A * 5/1989 Ichinose ............... B05B 15/555 427/427.2
4,977,000 A * 12/1990 Murayama .......... B05B 13/0452 427/427.2
5,482,556 A * 1/1996 Shutic ..................... B05B 5/032 118/712

(Continued)

FOREIGN PATENT DOCUMENTS

JP 2002306995 A 10/2002
JP 2016128149 A 7/2016

(Continued)

OTHER PUBLICATIONS

The Notice of Allowance on corresponding Korean Patent Application 10-2022-0142388 mailed on Oct. 29, 2024.

*Primary Examiner* — Jethro M. Pence

(57) ABSTRACT

A painting apparatus can suppress generation of air bubbles and non-uniform painting thickness on a painted surface during movement of a painting target. The painting apparatus includes at least one spray gun for spraying a paint toward a painting target; a y-axis movable bar connected to the spray gun so as to move the spray gun vertically; an x-axis movable bar connected to the y-axis movable bar so as to move the spray gun horizontally; a paint supply for supplying the paint to the spray gun; and a conveyor unit for transporting the painting target.

8 Claims, 1 Drawing Sheet

(56) References Cited

U.S. PATENT DOCUMENTS

| | | | | |
|---|---|---|---|---|
| 5,935,657 | A * | 8/1999 | Melendez | B05B 13/04 239/281 |
| 9,769,932 | B2 * | 9/2017 | Zwiers | B05B 1/08 |
| D950,679 | S * | 5/2022 | Wu | D23/225 |
| 2012/0288973 | A1 * | 11/2012 | Matsunaga | B05B 13/0221 427/427.3 |
| 2022/0097232 | A1 | 3/2022 | Ishizu et al. | |
| 2025/0205724 | A1 * | 6/2025 | Ballman | B05B 1/202 |

FOREIGN PATENT DOCUMENTS

| | | | |
|---|---|---|---|
| JP | 6733830 | B1 | 7/2020 |
| JP | 2021169070 | A | 10/2021 |
| KR | 20070031863 | A | 3/2007 |
| KR | 10-1675249 | B1 | 11/2016 |
| KR | 102286416 | B1 | 8/2021 |

* cited by examiner

PAINTING APPARATUS

CROSS-REFERENCE TO RELATED APPLICATION

This application claims priority from Korean Patent Application No. 10-2022-0142388 filed on Oct. 31, 2022 in the Korean Intellectual Property Office, and all the benefits accruing therefrom under 35 U.S.C. 119, the contents of which in its entirety are herein incorporated by reference.

BACKGROUND

Field

The present disclosure relates to a painting apparatus, and more particularly, a painting apparatus which can suppress generation of air bubbles and non-uniform painting thickness on a painted surface during movement of a painting target.

Description of Related Art

A market size of an automotive painting field is continuously growing due to generation of attractive paint textures and change in customer preference to vehicle exterior.

In this field of the automotive painting, in order to improve the appearance of the vehicle, it is necessary to solve problems such as air bubbles, paint clumping, and non-uniform painting thickness on the surface of a painted part.

To solve the above problems, research to supply uniform painting quality is being actively conducted around the world. Multinational companies are releasing products related to the painting apparatus.

However, this product is carried out autonomously by a robot arm, and thus has a problem of high cost. This high cost is problematic for small and medium-sized companies of painting the vehicle part.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is intended to solve the problems of the prior art as described above. A purpose of the present disclosure is to provide a painting apparatus which can suppress generation of air bubbles, paint clumping, and non-uniform painting thickness on a painted surface of a painting target.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

One aspect of the present disclosure provides a painting apparatus comprising: at least one spray gun for spraying a paint toward a painting target; a y-axis movable bar connected to the spray gun so as to move the spray gun vertically; an x-axis movable bar connected to the y-axis movable bar so as to move the spray gun horizontally; a paint supply for supplying the paint to the spray gun; and a conveyor unit for transporting the painting target.

In one implementation, the painting apparatus further comprises a controller configured to control a supply amount of the paint from the paint supply to the spray gun, a spray amount of the paint from the spray gun to the painting target, and/or a supply pressure of the paint to the paint supply to the spray gun.

In one implementation, the at least one spray gun includes a pair of spray guns, wherein the pair of spray guns are arranged such that a painting cover area of one of the pair of spray guns and a painting cover area of the other of the pair of spray guns do not overlap each other.

In one implementation, the pair of spray guns are oriented downwardly inclinedly so as to face each other.

In one implementation, the controller is configured to compare an amount of the paint to be supplied from the paint supply to the spray gun as instructed by the controller with an amount of the paint actually sprayed from the spray gun to the painting target.

In one implementation, upon determination based on the comparing result that the amount of the paint to be supplied from the paint supply to the spray gun as instructed by the controller is different from the amount of the paint actually sprayed from the spray gun to the painting target, the controller is configured to: determine that hardening of the paint has occurred in a paint transfer path from the paint supply to the spray gun or inside the spray gun; and temporarily increase a pressure at which the paint supply supplies the paint from the paint supply to the spray gun, or control a cleaning fluid supply to supply a cleaning fluid to clean a passage through which the paint is supplied from the paint supply to the spray gun.

In one implementation, the painting apparatus further comprises: an air intake unit disposed under a bottom of the conveyor unit and configured to intake air containing paint particles scattering from the paint sprayed through the spray gun; and a water curtain disposed on a side of the conveyor unit, wherein in the water curtain, water flows downwardly to absorb the paint particles scattering from the paint sprayed via the spray gun, wherein the air intake unit includes an air transfer path along which the absorbed air containing the paint particles flows toward the water curtain.

In one implementation, the spray gun includes at least one paint spray hole through which paint is sprayed, and at least one air spray hole through which air is sprayed, wherein the at least one air spray hole is positioned adjacent to the at least one paint spray hole.

In one implementation, the at least one air spray hole sprays the air at a temperature indicated by the controller.

In one implementation, the at least one air spray hole includes a plurality of air spray holes, wherein the plurality of air spray holes spray the air at different air spraying speeds, wherein an air spray hole among the plurality of air spray holes having an air spray direction toward the water curtain has a highest air spraying speed.

According to the present disclosure, the supply of the constant amount of the paint may achieve the uniform painting quality on the painted surface of the painting target.

According to the present disclosure, the painting apparatus which can suppress generation of air bubbles, paint clumping, and non-uniform painting thickness on a painted surface of the painting target may be realized.

In addition to the effects as described above, specific effects in accordance with the present disclosure will be described together with following detailed descriptions for carrying out the disclosure.

DETAILED DESCRIPTIONS

Figure 1:
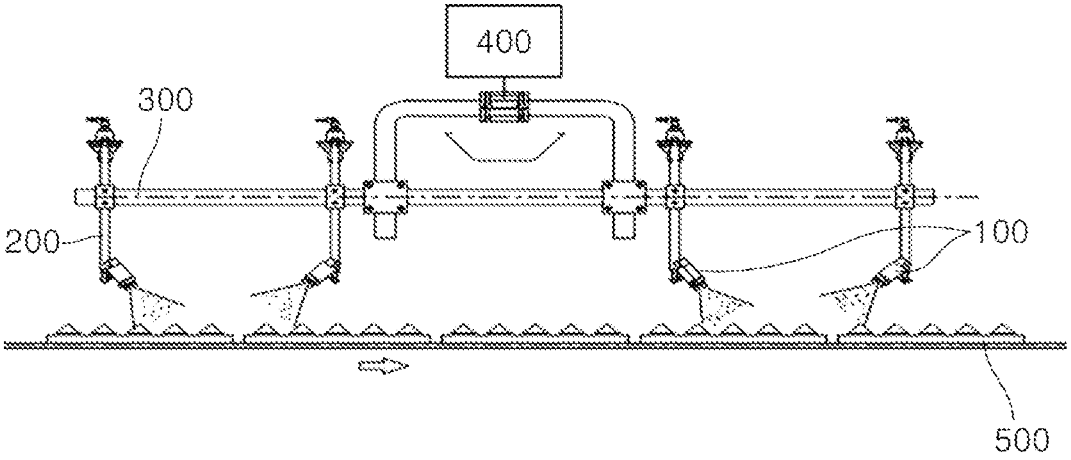
FIG. 1 and FIG. 2 are configuration diagrams of a painting apparatus according to the present disclosure.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may include within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms “a” and “an” are intended to include the plural forms as well, unless the context clearly indicates otherwise. It will be further understood that the terms “comprise”, “comprising”, “include”, and “including” when used in this specification, specify the presence of the stated features, integers, operations, elements, and/or components, but do not preclude the presence or addition of one or more other features, integers, operations, elements, components, and/or portions thereof. As used herein, the term “and/or” includes any and all combinations of one or more of the associated listed items. Expression such as “at least one of” when preceding a list of elements may modify the entirety of list of elements and may not modify the individual elements of the list. When referring to “C to D”, this means C inclusive to D inclusive unless otherwise specified.

It will be understood that, although the terms “first”, “second”, “third”, and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present “on” or “beneath” a second element or layer, the first element may be disposed directly on or beneath the second element or may be disposed indirectly on or beneath the second element with a third element or layer being disposed between and connected to the first and second elements or layers. It will be understood that when an element or layer is referred to as being “connected to”, or “coupled to” another element or layer, it may be directly on, connected to, or coupled to the other element or layer, or one or more intervening elements or layers may be present. In addition, it will also be understood that when an element or layer is referred to as being “between” two elements or layers, it may be the only element or layer between the two elements or layers, or one or more intervening elements or layers may also be present.

Further, as used herein, when a layer, film, region, plate, or the like may be disposed “on” or “on a top” of another layer, film, region, plate, or the like, the former may directly contact the latter or still another layer, film, region, plate, or the like may be disposed between and connected to the former and the latter. As used herein, when a layer, film, region, plate, or the like is directly disposed “on” or “on a top” of another layer, film, region, plate, or the like, the former directly contacts the latter and still another layer, film, region, plate, or the like is not disposed between and connected to the former and the latter. Further, as used herein, when a layer, film, region, plate, or the like may be disposed “below” or “under” another layer, film, region, plate, or the like, the former may directly contact the latter or still another layer, film, region, plate, or the like may be disposed between and connected to the former and the latter. As used herein, when a layer, film, region, plate, or the like is directly disposed “below” or “under” another layer, film, region, plate, or the like, the former directly contacts the latter and still another layer, film, region, plate, or the like is not disposed between and connected to the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may be actually executed at the same time. Depending on a related function or operation, the blocks may be executed in a reverse sequence.

The features of the various embodiments of the present disclosure may be partially or entirely combined with each other, and may be technically associated with each other or operate with each other. The embodiments may be implemented independently of each other and may be implemented together in an association relationship.

Spatially relative terms, such as “beneath,” “below,” “lower,” “under,” “above,” “upper,” and the like, may be used herein for ease of explanation for illustrating one element or feature’s relationship to another element or feature as illustrated in the figures. It will be understood that the spatially relative terms are intended to encompass different orientations of the device in use or in operation, in addition to the orientation depicted in the figures. For example, when the device in the drawings may be turned over, elements described as “below” or “beneath” or “under” other elements or features would then be oriented “above” the other elements or features. Thus, the example terms “below” and “under” may encompass both an orientation of above and below. The device may be otherwise oriented, for example, rotated 90 degrees or at other orientations, and the spatially relative descriptors used herein should be interpreted accordingly.

Hereinafter, preferred embodiments of the present disclosure will be described with reference to the attached drawings.

Figure 2:
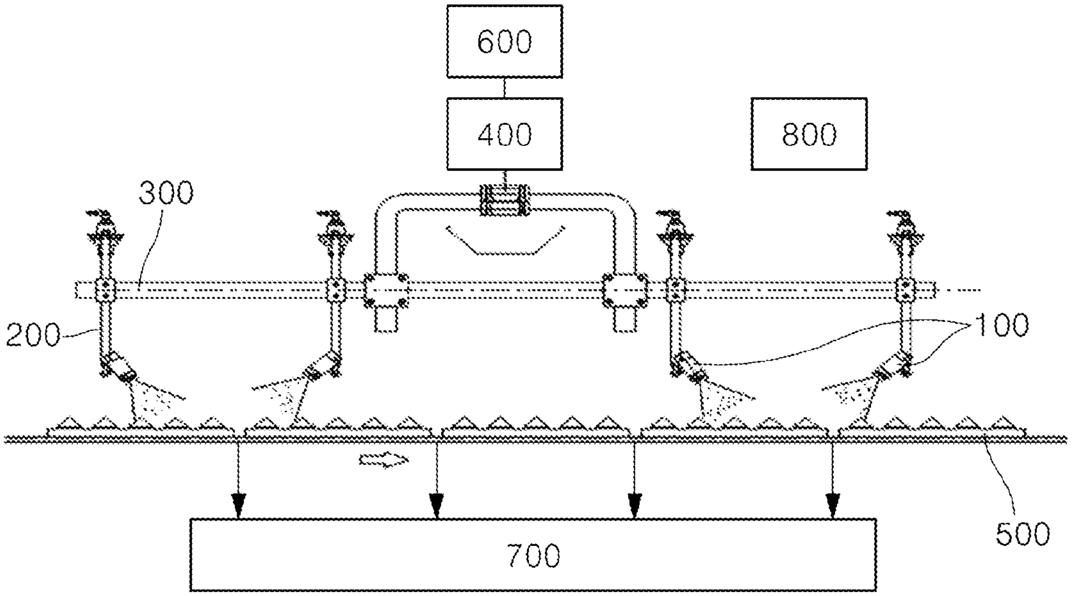

FIG. 1 and FIG. 2 are configuration diagrams of a painting apparatus according to the present disclosure.

Referring to FIG. 1 and FIG. 2, a painting apparatus according to the present disclosure includes at least one spray gun 100 for spraying a paint, a y-axis movable bar 200 connected to the spray gun 100 to move the spray gun 100 vertically, an x-axis movable bar 300 connected to the y-axis movable bar 200 to move the spray gun 100 horizontally, a paint supply 400 that supplies the paint to the spray gun, and a conveyor unit 500 that transports a painting target onto which the spray gun 100 sprays the paint.

The spray gun 100 has a nozzle that ejects the paint onto the painting target. In other words, the spray gun 100 may spray the paint through the nozzle to paint the painting target.

In this regard, the spray guns 100 are arranged in a paired manner. The same pair of the spray guns 100 may face the same painting target. In one example, when one spray gun 100 of the pair of spray guns 100 is oriented downwardly right, while the other spray gun 100 thereof is oriented downwardly left. In other words, the pair of spray guns 100 are oriented downwardly inclinedly so as to face each other.

In this regard, it is desirable that a painting cover area of one of the pair of spray guns 100 and a painting cover area of the other of the pair of spray guns 100 do not overlap each other. This is to suppress the non-uniform painting thickness. That is, when the painting cover area of one of the pair of spray guns 100 and the painting cover area of the other of the pair of spray guns 100 overlap each other, the thickness of the painting becomes larger in the overlapping area.

The y-axis movable bar 200 is connected to the spray gun 100 and controls the spray vertical level of the spray gun 100. In other words, the y-axis movable bar 200 controls the vertical level at which the spray gun sprays the paint onto the painting target. In this regard, a scheme in which the spray gun 100 is fixedly connected to the y-axis movable bar 200 is not limited to a specific scheme. The spray gun 100 is fixedly connected to the y-axis movable bar 200 in a rail manner or via a fastening structure.

Furthermore, the y-axis movable bar 200 includes a rotatable ball (not shown) at a position at which the y-axis movable bar 200 is connected to the spray gun 100. Thus, a paint spray angle of the spray gun 100 may be adjusted via the rotatable ball. Therefore, the vertical level and the angle at which the spray gun 100 sprays the paint on the painting target may be controlled while the spray gun 100 is connected to the y-axis movable bar 200.

The x-axis movable bar 300 is connected to the y-axis movable bar 200 and extends in a perpendicular manner to the y-axis movable bar 200. Therefore, when the x-axis movable bar 300 moves in the x-axis direction, the y-axis movable bar 200 to which the spray gun 100 is connected moves along the x-axis in the left and right direction. Alternatively, a spacing between the pair of spray guns 100 may be adjusted. In other words, the pair of spray guns 100 may individually move along the x-axis movable bar 300, such that the spacing between the pair of spray guns 100 may be adjusted.

The paint supply 400 supplies the paint to the spray gun 100 which paints the painting target. For this purpose, the paint supply may supply the paint to the spray gun 100 via the x-axis movable bar 300 and the y-axis movable bar 200. That is, each of the x-axis movable bar 300 and the y-axis movable bar 200 may be embodied as a paint transfer pipe. Alternatively, the paint supply 400 may be directly connected to the spray gun 100.

The conveyor unit 500 supports the painting target thereon and moves the painting target on top of the spray gun 100. The conveyor unit 500 is preferably embodied as a conveyor belt.

Furthermore, the painting apparatus according to the present disclosure further includes the controller 600 that controls, determines, and instructs a supply amount and a supply pressure of the paint supplied from the paint supply 400 to the spray gun 100, and controls, determines, and instructs a spray amount and a spray pressure of the paint sprayed from the spray gun 100 to the painting target, and controls, determines, and instructs a supply temperature of the paint, and controls, determines, and instructs a supply pressure of the paint to the paint supply to the spray gun.

Furthermore, when a type and a color of the paint is to be changed, the controller 600 may allow a cleaning liquid corresponding thereto to be supplied to the paint supply to clean an inner surface of the paint supply.

In this regard, the controller 600 may compare an amount of the paint to be supplied from the paint supply 400 to the spray gun 100 as instructed by the controller 600 with an amount of the paint actually sprayed from the spray gun 100 to the painting target. Upon determination that the amount of the paint to be supplied from the paint supply 400 to the spray gun 100 as instructed by the controller 600 is different from the amount of the paint actually sprayed from the spray gun 100 to the painting target, the controller may determine that a problem has occurred in the painting process currently in operation.

In this regard, the problem occurring in the painting process may be due to the paint leaking during the process of transferring the paint from the paint supply 400 to the spray gun 100. In general, partial hardening of the paint may occur in the process of transferring the paint from the paint supply 400 to the spray gun 100. Therefore, upon determination that the amount of the paint to be supplied from the paint supply 400 to the spray gun 100 as instructed by the controller 600 is larger from the amount of the paint actually sprayed from the spray gun 100 to the painting target, in order to obtain a uniform painting result, the controller 600 may temporarily increase the pressure at which the paint supply 400 supplies the paint from the paint supply 400 to the spray gun 100, or may control a cleaning fluid supply (not shown) to supply the cleaning fluid to clean a passage through which the paint is supplied from the paint supply 400 to the spray gun 100.

Whether the controller 600 temporarily increases the pressure at which the paint supply 400 supplies the paint from the paint supply 400 to the spray gun 100, or controls the cleaning fluid supply (not shown) to supply the cleaning fluid to clean the passage through which the paint is supplied from the paint supply 400 to the spray gun 100 may be determined based on whether a difference between the amount of the paint to be supplied from the paint supply 400 to the spray gun 100 as instructed by the controller 600 and the amount of the paint actually sprayed from the spray gun 100 to the painting target is equal to or smaller than a reference value.

In one example, when the difference between the amount of the paint to be supplied from the paint supply 400 to the spray gun 100 as instructed by the controller 600 and the amount of the paint actually sprayed from the spray gun 100 to the painting target is equal or smaller than 1% of the amount of the paint to be supplied from the paint supply 400 to the spray gun 100 as instructed by the controller 600, the controller 600 temporarily increases the pressure at which the paint supply 400 supplies the paint from the paint supply 400 to the spray gun 100. However, when the difference between the amount of the paint to be supplied from the paint supply 400 to the spray gun 100 as instructed by the controller 600 and the amount of the paint actually sprayed from the spray gun 100 to the painting target is larger than 1% of the amount of the paint to be supplied from the paint supply 400 to the spray gun 100 as instructed by the controller 600, the controller controls the cleaning fluid supply (not shown) to supply the cleaning fluid to clean the passage through which the paint is supplied from the paint supply 400 to the spray gun 100. This is because when the difference between the amount of the paint to be supplied from the paint supply 400 to the spray gun 100 as instructed by the controller 600 and the amount of the paint actually sprayed from the spray gun 100 to the painting target is larger than 1% of the amount of the paint to be supplied from the paint supply 400 to the spray gun 100 as instructed by the controller 600, variation in the appearance may be visually recognized by the viewer.

Furthermore, the apparatus of the present disclosure may include means for absorbing and removing scattering paint particles in order to prevent phenomena such as the paint clumping and the painting lifting due to the scattering of the paint being sprayed via the spray gun 100. For this purpose, the painting apparatus of the present disclosure may include an air intake unit 700 disposed under a bottom of the conveyor unit 500 and configured to intake air containing the paint particles scattering from the paint sprayed through the spray gun 100, and a water curtain 800 disposed on a side of the conveyor unit 500. In the water curtain 800, the water flows from the top to the bottom to absorb the paint particles scattering from the paint sprayed via the spray gun 100.

The air intake unit 700 absorbs the paint particles scattering from the paint sprayed from the spray gun 100 located on top of the painting target. In other words, the air intake unit 700 disposed under the bottom of the conveyor unit 500 absorbs the air containing the paint particles scattering from the paint sprayed from the spray gun 100 located on top of the painting target. Thus, the air intake unit can immediately absorb not only the paint particles scattering from the paint which non-contacts the painting target, but also the paint particles scattering from the paint which contacts the painting target.

The water curtain 800 absorbs the paint particles scattering from the paint that has been sprayed from the spray gun 100 during a process of painting the painting target. The water curtain 800 acts as a water wall located on the side of the conveyor unit 500 in the lateral direction in which the conveyor unit 500 moves. In the water curtain, the water flows from the top to the bottom. Therefore, even when the paint scatters into the particles which in turn move upward, the particles may be absorbed by the water.

In this regard, the air intake unit 700 guides the air containing the absorbed paint particles toward the water curtain 800. In other words, it is desirable that the air intake unit 700 according to the present disclosure further includes an air delivery path extending along a bottom of the conveyor unit 500 and toward the water curtain 800. In this regard, the air containing the scattered paint particles absorbed by the air unit intake 700 is delivered from a location of the air intake unit in contact with the water curtain 800 toward a bottom of the water curtain 800 in order to prevent the scattered particles contained in the air from re-floating. That is, it is preferable that a rear end of the air delivery passage is oriented downwardly.

Furthermore, the spray gun 100 according to the present disclosure includes a paint spray hole through which paint is sprayed, and at least one air spray hole through which air is sprayed and which is disposed adjacent to the paint spray hole.

One or more air spray holes are formed such that the paint particles scattering from the paint sprayed from the spray gun 100 move toward the water curtain 800 as described above. That is, the air spray holes may spray the air toward the water curtain 800.

When a plurality of air spray holes are formed, air spray rates and air spray pressures of the air spray holes are different from each other. Thus, the air may flow toward the water curtain 800 in a more controlled manner. In one example, an air spray hole among the plurality of air spray holes having an air spray direction toward the water curtain has a highest air spraying speed.

Furthermore, the one or more air spray holes spray the air at a temperature indicated by the controller 600. For this purpose, the spray gun 100 in accordance with the present disclosure includes heating means disposed on the inner circumferential surface of the air spray hole for heating the air to be sprayed. However, in order to prevent the paint sprayed through the paint spray hole from being heated by the heating means for heating the air sprayed through the air spray hole, the paint spray hole and the air spray hole of the spray gun 100 may be thermally insulated from each other via a thermal insulating panel made of the thermal insulating material.

An appropriate temperature range of a surrounding space in which the painting of each of types of the paints is performed may be set. Thus, the heated air is sprayed from the air spray hole into the surrounding space, that is, the space where the painting apparatus is installed to heat the space to the appropriate temperature.

Although the embodiments of the present disclosure have been described above with reference to the accompanying drawings, the present disclosure may not be limited to the embodiments and may be implemented in various different forms. Those of ordinary skill in the technical field to which the present disclosure belongs will be able to understand that the present disclosure may be implemented in other specific forms without changing the technical idea or essential features of the present disclosure. Therefore, it should be understood that the embodiments as described above are not restrictive but illustrative in all respects.

What is claimed is:

1. A painting apparatus comprising:

at least one spray gun for spraying paint toward a painting target;

a y-axis movable bar connected to the spray gun so as to move the spray gun vertically;

an x-axis movable bar connected to the y-axis movable bar so as to move the spray gun horizontally;

a paint supply for supplying the paint to the spray gun; and a conveyor unit for transporting the painting target;

wherein the painting apparatus further comprises a controller configured to control a supply amount of the paint from the paint supply to the spray gun, a spray amount of the paint from the spray gun to the painting target, and/or a supply pressure of the paint to the paint supply to the spray gun;

wherein the at least one spray gun includes a pair of spray guns, wherein the pair of spray guns are arranged such that a painting cover area of a first one of the pair of spray guns and a painting cover area of a second one of the pair of spray guns do not overlap each other.

2. The painting apparatus of claim 1, wherein the pair of spray guns are oriented downwardly inclinedly so as to face each other.

3. The painting apparatus of claim 2, wherein the controller is configured to compare an amount of the paint to be supplied from the paint supply to the spray gun as instructed by the controller with an amount of the paint actually sprayed from the spray gun to the painting target.

4. The painting apparatus of claim 3, wherein upon determination based on the comparing result that the amount of the paint to be supplied from the paint supply to the spray gun as instructed by the controller is different from the amount of the paint actually sprayed from the spray gun to the painting target, the controller is configured to: determine that hardening of the paint has occurred in a paint transfer path from the paint supply to the spray gun or inside the spray gun; and temporarily increase a pressure at which the paint supply supplies the paint from the paint supply to the spray gun, or control a cleaning fluid supply to supply a cleaning fluid to clean a passage through which the paint is supplied from the paint supply to the spray gun.

5. The painting apparatus of claim 4, wherein the painting apparatus further comprises: an air intake unit disposed under a bottom of the conveyor unit and configured to intake air containing paint particles scattering from the paint sprayed through the spray gun; and a water curtain disposed on a side of the conveyor unit, wherein in the water curtain, water flows downwardly to absorb the paint particles scattering from the paint sprayed via the spray gun, wherein the air intake unit includes an air transfer path along which the absorbed air containing the paint particles flows toward the water curtain.

6. The painting apparatus of claim 5, wherein the spray gun includes at least one paint spray hole through which paint is sprayed, and at least one air spray hole through which air is sprayed, wherein the at least one air spray hole is positioned adjacent to the at least one paint spray hole.

7. The painting apparatus of claim 6, wherein the at least one air spray hole sprays the air at a temperature indicated by the controller.

8. The painting apparatus of claim 7, wherein the at least one air spray hole includes a plurality of air spray holes, wherein the plurality of air spray holes spray the air at different air spraying speeds, wherein a first air spray hole among the plurality of air spray holes having an air spray direction toward the water curtain has a highest air spraying speed.

* * * * *